DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 15, 1972

901 O.G. 777

T901,027

NUCLEAR REACTOR HAVING THERMALLY COMPENSATED SUPPORT STRUCTURE FOR A FUEL ASSEMBLY

Ray Borst, Irwin, Pa., assignor to Westinghouse Electric Corporation, Pittsburgh, Pa.

Filed Nov. 25, 1970, Ser. No. 92,781
Int. Cl. G21c *19/00*
U.S. Cl. 176—40
1 Sheet Drawing. 11 Pages Specification

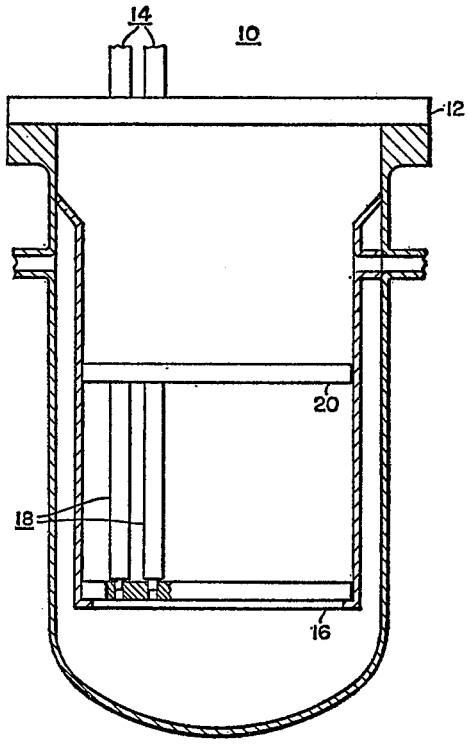

There is disclosed a thermal expansion compensation system for overcoming the deformation and bowing of nuclear fuel assemblies in a reactor. The drawing shows a reactor wherein there is a top plate 12 having control rod drive mechanism 14; a core bottom support plate 16; a coretop hold down plate 20; and fuel assemblies 18. To reduce deformation or bowing of the fuel assemblies 18 the plates 12, 16 and 18 are made of materials having thermal expansion rates such that the total thermal expansion of each of the support plates is substantially the same.

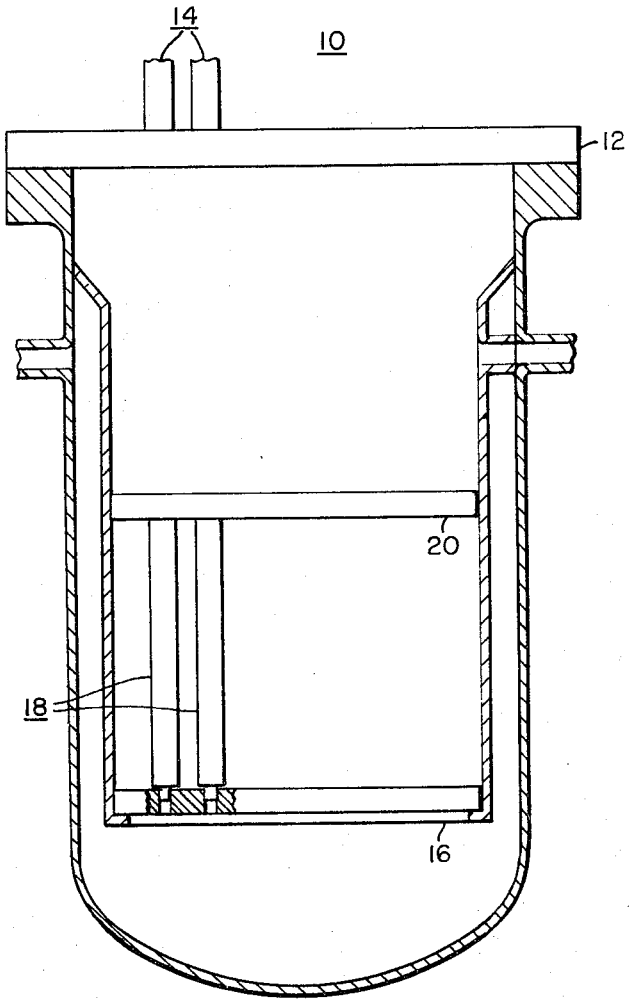

Aug. 15, 1972 R. BORST T901,027
NUCLEAR REACTOR HAVING THERMALLY COMPENSATED SUPPORT STRUCTURE FOR A FUEL ASSEMBLY
Filed Nov. 25, 1970